Aug. 22, 1939.   F. A. FAUST   2,170,402
AUTOMATIC TEMPERATURE CONTROL SYSTEM
Filed Oct. 1, 1937   2 Sheets-Sheet 2

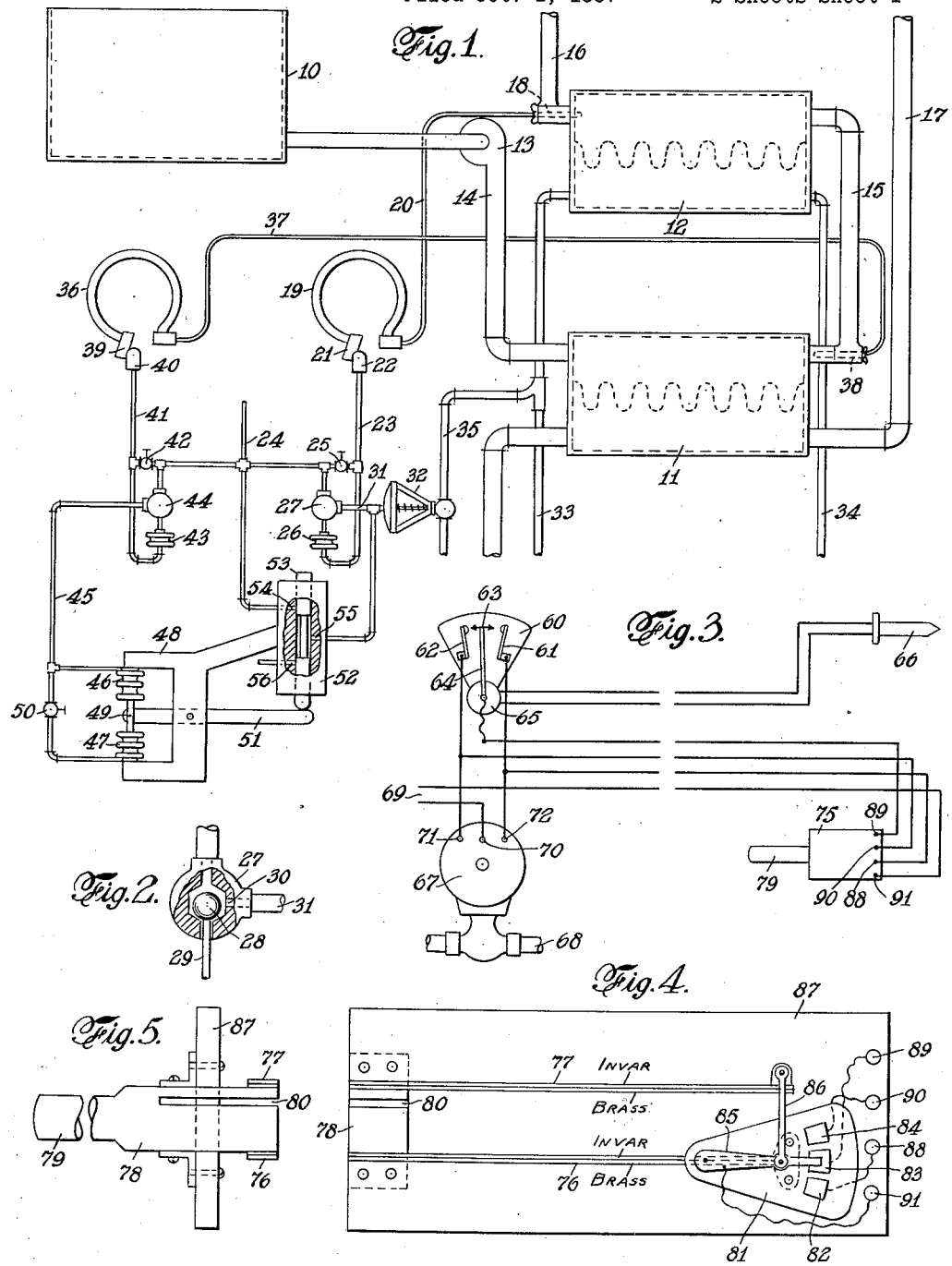

INVENTOR.
FREDERICK A. FAUST
BY
ATTORNEY.

Patented Aug. 22, 1939

2,170,402

UNITED STATES PATENT OFFICE 2,170,402

AUTOMATIC TEMPERATURE CONTROL SYSTEM

Frederick A. Faust, Waterbury, Conn., assignor to The Bristol Company, Waterbury, Conn., a corporation of Connecticut Application October 1, 1937, Serial No. 166,734

14 Claims. (Cl. 236—18)

This invention relates to the control of temperatures in heat exchange apparatus for flowing fluids, and especially to that type and application of heat exchanger apparatus as used in the dairy industry for the pasteurization of milk, wherein the apparatus is constituted of at least two parts—a heating section and a regenerating section. In such installations, it is customary for the milk to be circulated by a pump, milk in a raw state first entering the regenerating section where heat is transferred to it from the stream of milk flowing out from one or other of a group of holding tanks through an adjacent compartment of the particular section. The milk then passes to the heating section of the apparatus where it is raised to a final and predetermined temperature by transfer of heat from hot water circulating in an adjacent compartment. From the last-named section the milk passes to a holding tank, where it is retained for a time interval necessary to effect the process of pasteurization. It then passes to the said regenerator section, giving up much of its heat to the incoming milk, and finally to a cooler, where it is reduced to a temperature suitable for bottling. Under normal steady-state conditions it is possible to control with greater precision the temperature of the milk leaving the heater, through the simple expedient of regulating the temperature of the circulating water as by the admission of more or less steam to the inflowing water through an automatically positioned valve. This valve may be subjected to automatic regulation by any one of a number of well known methods.

It is an object of this invention to superimpose on an automatic control as outlined hereinbefore a secondary or auxiliary control which will respond to sudden changes in the "load" on the system, such as might be caused by a change in the initial temperature of the raw milk, or by a change in the rate of flow of the outgoing milk stream through the regenerator.

A further object is to effect a control such as will tend to anticipate the demand for a changed supply of heating agent as would subsequently be made apparent in the temperature of the milk leaving the heater; and, being of a temporary nature, such anticipatory control will be effective only at times of change in the load.

It is proposed to effect this result by providing in addition to the usual elements of an automatic and basic temperature control system an auxiliary control, commanded by an element sensitive to the temperature of the milk as it leaves the regenerator section, the control being of a magnitude sufficient to override the said basic control. Moreover, a timing element is incorporated whereby, upon attainment of a steady temperature in the milk, as determined by said sensitive element, the auxiliary control is withdrawn and the whole function of temperature regulation reverts to the basic control.

The nature of the invention, however, will best be understood when described in connection with the accompanying drawings, in which:

Fig. 1 is a diagrammatic representation of a system of pneumatic control adapted to the pasteurization of milk and incorporating the principles of the invention.

Fig. 2 is a view, partly in section and to an enlarged scale, of a form of pilot valve utilized in the control system.

Fig. 3 is a diagrammatic representation of an electrical control system embodying the principles of the invention.

Figs. 4 and 5 represent respectively a top and an end elevation of a timing thermo-sensitive member adapted for use with the electrical embodiment of this invention.

Figure 6:
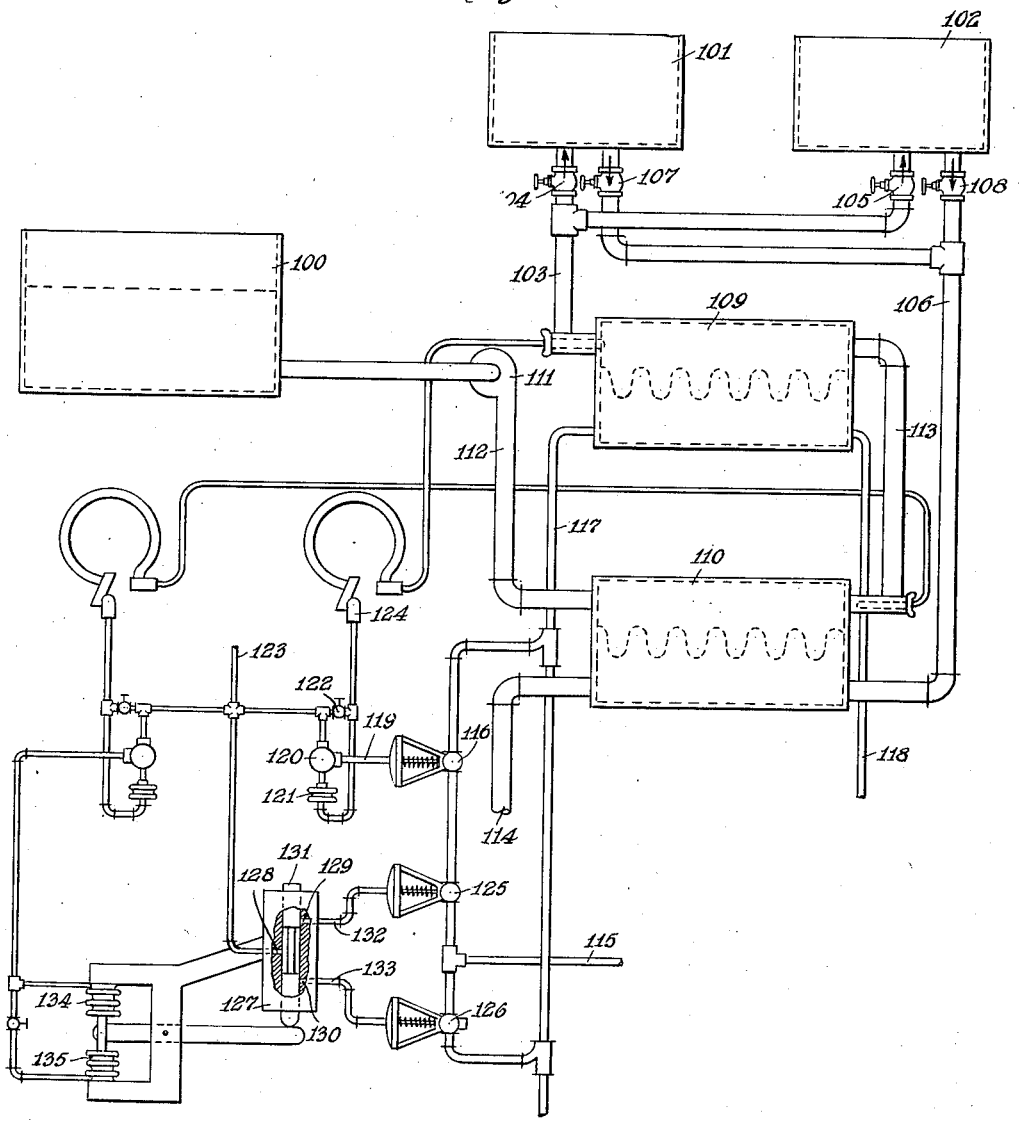
Fig. 6 is a diagrammatic representation of a system of pneumatic control in an installation for pasteurizing milk, and embodying certain modifications of the principles set forth in the preceding drawings.

Referring to the drawings, 10 designates a raw milk tank, and 11 and 12 heat exchanges known respectively as the "regenerator" and the "heater". A third heat exchanger known as the "cooler", and customarily included in an installation of this nature, is for the sake of simplicity omitted from the drawings. Under the influence of a pump 13, milk may pass from the raw milk tank 10 through a pipe 14 to the one side or compartment of the regenerator 11, and thence through a pipe 15 to the heater 12. Here it is brought into intimate thermal association with circulating water in the adjacent compartment, after which it may emerge through an outlet pipe 16 and be carried to one or another of a group of holding tanks not shown in the drawings, but similar in all respects to those subsequently disclosed and set forth in connection with Fig. 6. Milk drawn from a holding tank may later pass through a pipe 17 to the regenerator 11, giving up a large part of its heat to the incoming milk, afterwards flowing to the cooler (not shown) where its temperature is reduced to a final value for bottling.

For the sake of simplicity, the basic or normal regulation of the milk temperature is shown as being under control of a temperature-sensitive bulb 18 containing a volatile or expansible fluid and exposed to the temperature of the milk stream emerging from the heater 12, and acting upon a regulating device substantially of the type set forth and claimed in United States Letters Patent No. 1,880,247, granted October 4, 1932, to applicant's assignee, and whereby live steam is mixed with the circulating water in a proportion necessary to maintain the desired predetermined outlet temperature on the milk.

This control embodies, for example, a Bourdon spring 19 which communicates with the bulb 18 by means of a capillary tube 20, and serves to actuate a vane 21 movable in juxtaposition to the jets of a double-opposed orifice member 22 communicating with a conduit member 23. The latter receives compressed air from a supply conduit 24 through a constriction 25, and thereby governs the pressure of air in said conduit.

Communicating with conduit 23 is an expansible bellows member 26 arranged to actuate a pilot valve 27, which may be of the form shown in detail in Fig. 2. In this type of valve, a ball seating member 28, actuated through a pin 29, is adapted to engage either of two seats communicating with the air supply conduit 24 and the outside atmosphere respectively. A port 30 of the valve communicates with a conduit 31 leading to the diaphragm top of a pneumatically actuated regulating valve 32 of the direct-acting type, tending to close under the influence of air pressure in its diaphragm top and to open when said pressure is relieved. With this combination, it will be apparent that, upon an increase of temperature at the bulb 18, the consequent increase of pressure of the contained fluid, acting through the capillary tube 20 upon the Bourdon spring 19, will tend to move the vane 21 away from the orifice member 22, increasing the effective opening thereof and correspondingly reducing the air pressure in conduit 23 and in the communicating bellows 26. The corresponding collapse of the bellows will cause the pin 29 to be lowered, carrying the ball 28 toward a position where it tends to close the vent to the atmosphere and correspondingly open the communication with the supply conduit 24, whereby there will be built up an increased pressure in the conduit 31 and in the diaphragm of regulating valve 32, tending to close its ports.

Circulation of heating water in the heater 12 is effected by a system of pipes including an inlet pipe 33 and an outlet pipe 34, through which water may be circulated by means of a pump not shown in the drawings. Live steam is admitted to the inlet pipe through the regulating valve 32 and a pipe 35.

Following the operating cycle of the regulator, it will be apparent that a change of temperature of the outgoing milk, as detected by the sensitive element 18, will react, through the pneumatic control system as hereinbefore set forth, upon the regulating valve 32 to modify the rate of admission of steam to the circulating water in a sense to oppose and neutralize the temperature variation.

The control or regulating system as thus far described does not differ materially from a number of well-known regulating systems; and for it no invention is herein claimed. In the event, however, of extreme variations in the demand for temperature adjustment, it is apparent, since the regulator is affected solely by temperature changes of the outflowing milk about to be delivered to the holding tank, that it is possible for milk at an improper temperature to reach the holding tank before the corrective effect of the regulating system could become apparent. Since any change in load would be followed by a change in temperature of the milk leaving the regenerator, it will be apparent that an auxiliary control based upon this temperature and made effective only during such time as this temperature is changing could be superimposed on the basic control, with a resultant tendency to anticipate the demand for extreme controlling influence to meet the extreme load changes. With this in view there is provided the following auxiliary equipment:

A Bourdon spring 36, actuated through a capillary tube 37 from a sensitive bulb 38, is inserted in the milk pipe 15, for example, at the point of emergence from the regenerator, although it will be understood that it may be located at other points in the milk line as desired. This spring serves to actuate a vane 39 in proximity to an orifice member 40 connected to a conduit 41, receiving air through a constriction 42 from the supply conduit 24, whereby the pressure of air in conduit 41 is made subject to the temperature to which bulb 38 is exposed.

Communicating with the conduit 41 is an expansible bellows 43 arranged to actuate a pilot valve 44 identical in all respects with pilot valve 27 in the basic control system and as is set forth in detail in Fig. 2. Supplied through valve 44, and having the air pressure therein regulated thereby, is a conduit 45 communicating with two bellows members 46 and 47, carried on a common support 48 and directly opposing their effects through a connecting member 49. Conduit 45 communicates freely with bellows member 46 and, through a constriction 50, with bellows member 47.

A lever arm 51 is pivoted to the support 48 and is arranged to be moved through a limited angle about its pivot point by the member 49, the direction of its angular deflection depending upon which of the two bellows members may be exerting the predominating influence, and assuming an intermediate position when the two bellows members are in equilibrium. Axially disposed within a cylindrical casing 52 carried by the support 48 is a piston valve member 53 arranged to be actuated by the lever arm 51 and to occupy a neutral or inactive position when the latter is in its intermediate position, corresponding to a balance between the two bellows members 46 and 47.

The casing 52 includes three ports—a port 54 communicating with the supply conduit 24, a port 55 communicating with conduit 31 and therethrough with the diaphragm motor of regulating valve 32, and a port 56 communicating with the outside atmosphere. When the piston valve is in its neutral position, both ports 54 and 56 are closed from communication with the port 55. When the piston valve is deflected toward its upward position under influence of expansion of bellows member 46 acting through the lever arm 51, port 55 is placed in communication with port 54; and when towards the lower limit under influence of bellows 47, port 55 is placed in communication with port 56 and the outside atmosphere. The areas of opening of these ports and associated conduits is such that upon opening of any of them by movement of the piston valve 53, the flow of air into or out of the conduit 31, as the case may be, will be of such magnitude as to override the effect of the primary or basic control and render it for the time inconsequential.

The action of the auxiliary control apparatus is as follows: Assuming first a condition of steady temperature at the bulb 38, the spring 36 and vane 39 will assume a definite position relatively to the orifice member 40, thereby maintaining in the conduit 41 and bellows 43 an air pressure corresponding to the said steady temperature; and this pressure being communicated to the bellows members 46 and 47, and affecting them equally, will hold the lever 51 and the piston valve 53 in their neutral position, where, port 55 being cut off from outside communication, no effect will be produced on the pressure in conduit 31, and regulation of valve 32 will be subject solely to the basic or primary control as determined by sensitive member 18. It will be obvious that this condition will exist for any steady value of temperature at the bulb 38, and therefore for any steady load on the control system.

Assuming now a change in load as manifested in a sudden drop in the temperature of the milk passing bulb 38, due, for example, to the addition of a cold batch to the raw milk tank 10, or to disturbance of the flow of warm milk from the holding tanks at the time of changing from one tank to another, the action of the Bourdon spring 36 in response to said change will be to move vane 39 into closer association with the orifice member 40. This causes the back pressure to build up in conduit 41 and bellows 43, moving valve 44 to a position where communication between conduits 45 and 24 would be obstructed and the former vented to the atmosphere, causing the pressure therein to be reduced. This pressure reduction will at once be communicated to bellows member 46, which is in free communication with conduit 45; while, owing to the constriction 50, the response of bellows 47 will be much more gradual. The differential pressure thus set up between the bellows members 46 and 47 will cause the connecting member 49 to rise, lowering the right-hand end of lever 51 and the piston valve 53, whereby ports 55 and 56 will be placed in communication, and the conduit 31 vented to the atmosphere. By this expedient, the basic control is over-ridden, allowing the valve 32 to open and admitting an increased flow of live steam to the circulating water entering the heater 12. There is thus communicated to the milk therein an increased heating influence to counteract the reduction of temperature in the milk leaving the regenerator.

It will be seen that upon a sudden rise in temperature of the milk leaving the regenerator, the several elements of the auxiliary control will perform in a sense the reverse of that hereinbefore set forth, so that the piston valve 53 will be moved upward, increasing air pressure in the regulating valve 32 and reducing the supply of live steam, so as to produce a rapid reduction of temperature to offset the sudden rise, before the stream has passed through the heater to the basic control bulb 18.

Upon the attainment of a steady temperature at the bulb 38, and consequent steady pressure conditions in the control system, the pressure in bellows member 47 will quickly equalize through constriction 50 with that in bellows 46, returning the piston valve 53 to its inactive position, and causing the system to revert to normal control. The auxiliary control thus is effective only during those times that the temperature at the bulb 38 is changing from one value to another.

A true "anticipatory" control has thereby been provided, by which any extreme action, which would normally be demanded of the primary or basic controlling system in response to change in the temperature of the milk entering the heater, is automatically anticipated by the action of the auxiliary controller, which takes precedence over the primary controller, and establishes a corrective influence before the primary controller is able to respond.

A system of electrical control embodying the invention is shown in Figs. 3 to 5. Referring to Fig. 3, the numeral 60 designates a basic or primary controller having "high" and "low" electrical contacts 61 and 62, respectively, with which is associated a movable contact 63 carried on a swingable arm 64. The said contact 63 is adapted to engage either contact 61 or contact 62 as the arm 64 may be deflected by an element 65 responding to changes in a temperature-sensitive element 66, located in the outflowing stream of milk from the heater, and corresponding in position and function to the bulb 18 of the embodiment illustrated in Fig. 1. The element 66 may take the form of a hollow bulb containing a volatile or expansive fluid, and actuating a Bourdon spring member attached to the arm 64; or it may be in the nature of a thermocouple or a resistance "bulb", in which case the element 65 will be an electrical movement adapted, upon change in the temperature to which the temperature-sensitive element 66 may be exposed, to cause the contact 63 to engage contact 61 or contact 62 according to the direction of the temperature change—all of which is well known in the art.

A reversible motor valve 67 is connected in the live steam line 68, corresponding to the line 35 hereinbefore set forth, as forming a part of the temperature regulating system; and is adapted to operate in a sense to open or close its ports according to whether electrical potential from a source 69 is applied between a common terminal 70 and an "open" or a "close" terminal 71 and 72, respectively.

For the purpose of effecting the required "anticipating" action, there is provided an auxiliary controller 75, whose operating principle will be understood by reference to Figs. 4 and 5. This device includes a temperature-sensitive element and an electrical contacting system adapted to be actuated thereby in a sense that so long as the temperature to which said element is exposed remains constant, and without respect to the actual value of the temperature, a certain electrical circuit will be established, and during times of temperature change said circuit will be interrupted and other circuits will be established in a sense depending upon whether the temperature be rising or falling. The temperature-sensitive element may take the form of a pair of similar bimetallic strip members 76 and 77, both secured to a common thermally conducting support 78 and arranged to deflect both in the same sense upon change in the temperature of the support. An extended projection 79 of the support 78 is adapted to be exposed to the temperature whose rate of change is to be incorporated in the control, similarly to the bulb 38 within conduit 15 in Fig. 1 of the drawings. The portion of the support 78 which carries the bimetallic strips is made non-uniformly conducting as by the provision of an asymmetrically located slot 80, whereby upon any change of temperature of the portion 79 the strip 77 will respond to said change more slowly than the strip 76, introducing a more or less definite time lag between the movements of the two strips. Carried by the strip 76, and movable therewith in response to temperature changes, is an insulating plate 81, having mounted thereon three contact members 82, 83, and 84. Pivotally mounted on the plate 81 is a contact arm 85 adapted to engage any one of the three contact members 82, 83, or 84, and operatively connected by a link 86 to the bimetallic member 77.

An insulating terminal plate 87 carried by the member 78 serves as a mounting for four binding posts 88, 89, 90, and 91 connected by flexible leads to the contact members 82, 83, 84, and 85, respectively. Thus, with the elements of the bimetallic strips disposed as indicated in Fig. 4, a rising temperature of the part 79 will affect the strip 76 before it affects the strip 77, so that the former will tend to approach the latter, and the plate 81 will be carried into a position where the strip 77, acting through the link 86, will cause the contact arm 85 to leave the contact 83 and engage the contact 82, establishing electrical connection between binding posts 91 and 88. Similarly, upon cooling of the projection 79, the bimetallic strips will tend to diverge, causing contact arm 85 to engage contact element 84, establishing connection between terminals 91 and 90. Upon attainment of a constant temperature by the part 79 and the support 78, the temperature of the strips 76 and 77 will in time become equalized, causing the strips 76 and 77 to assume parallelism, and the contact 85 to engage contact 83, establishing connection between terminals 91 and 89.

The complete electrical connection necessary to incorporate the auxiliary control in the regulating system is shown in Fig. 3. The "low" contact 62 of the controller 60 is connected to the "open" terminal of the motor valve 67, and to the same point is connected the terminal 90 of the auxiliary controller 75. The "high" contact 61 of the controller 60 is connected to the "close" terminal of the motor valve, and to the same point is connected the terminal 88 of the auxiliary controller. One side of the supply is connected to the common terminal of the motor valve, and the other side to the terminal 91 of the auxiliary controller. The terminal 89 of the auxiliary controller is connected to the moving contact 63 of the primary controller 60.

Connection from the line to the contact 63 of the controller 60 being provided under normal conditions through terminals 91 and 89 of the auxiliary controller, the operation of the basic control, as effected by the controller 60 under influence of the temperature-sensitive member 66 presents no novel features to those versed in the art, and need not here be further elucidated.

Upon a change in temperature of the stream of milk to which the temperature-sensitive element 79 is exposed, the auxiliary control will become active in the following manner: Assuming a sudden cooling of the milk leaving the regenerator, the bimetallic strip 76 will respond in advance of the strip 77; and the contacting elements will coact as hereinbefore set forth, first to interrupt connection between terminals 91 and 89, and then to establish connection between 91 and 90. The separation of 91 and 89 serves to render the controller 60 ineffective, and the completion of a circuit between 91 and 90 energizes the motor valve 67 in a sense to open its ports and increase the flow of live steam to be mixed with the circulating water in the heater. Thus the lowering of temperature produces an immediate effect with a tendency to increase the heating influence in the heater before the bulb 66 can take cognizance of the changed condition. As the temperature at the element 79 becomes steady, the contact system will revert to its normal state, and normal control subject to controller 60 will be re-established.

It will be apparent that upon a sudden increase in temperature of the milk leaving the regenerator, the contacting system will be actuated by the temperature-sensitive member 79 in a sense the exact reverse of that hereinabove set forth, and the valve 67 will be caused to close. Similarly to the previously described embodiment, a true "anticipatory" control has thereby been provided by which any extreme action, which would normally be demanded of the primary or basic controlling system in response to change in the temperature of the milk entering the heater, is automatically anticipated by the action of the auxiliary controller.

In Fig. 6 is shown an installation of a system of control suited to the pasteurization of milk, and embodying a combination alternative to that shown in Fig. 1, and including certain auxiliary elements of the system pertinent also to, but not shown in, Fig. 1. In the embodiment illustrated, 100 designates a raw milk tank, and 101 and 102 two holding tanks adapted to retain milk at a pasteurizing temperature for a definite time period during which the process of pasteurization takes place. The said holding tanks 101 and 102 are placed in communication with an inlet pipe 103 by valves 104 and 105, respectively, and with an outlet pipe 106 by valves 107 and 108, respectively. The purpose of these valves is to control the distribution of milk between the respective tanks; and their operation, which may be either manual or automatic, forms no part of the present invention.

Associated with the milk tanks are two heat exchangers, viz: a "heater" 109 and a "regenerator" 110, interconnected in the following manner: A circulating pump 111 is arranged to draw milk from the raw milk tank 100 and force it through a pipe 112 to the cold side of the regenerator 110, and thence through a pipe 113 to the cold side of the heater, and thence through the pipe 103 to one or the other of the holding tanks, according to the setting of the valves 104 and 105. After having been retained for a specified time during which pasteurization takes place, milk is permitted to flow from the tank 101 or 102, according to the setting of the valves 107 and 108, through the pipe 106 to the hot side of the regenerator 110, and thence through a pipe 114 to the outlet of the system.

Final control of the temperature of the milk before leaving the heat exchanger 109 on its way to the holding tank is effected by regulation of the flow of steam admitted from a suitable source 115 through a pneumatically actuated regulating valve 116 to a circulating system including a pipe 117 wherein it is mixed with circulating water and admitted to the hot side of the heat exchanger 109. The water is withdrawn from the heat exchanger 109 through a discharge pipe 118 and subsequently recirculated by pump or other means (not shown), and forming no part of the invention.

The valve 116 is actuated by air pressure applied thereto through a conduit 119 receiving air as controlled by a three-way valve 120 actuated by an expansible bellows member 121. Air pressure within the bellows member 121 is subject to the joint influence of admission of air through a constriction 122 from a constant-pressure source 123, and the escape of air from an orifice element 124 having its vent controlled by a freely deflecting vane actuated by a movable member subject to the condition to be controlled, all of which has been hereinabove clearly set forth in connection with Fig. 1 of the drawings.

Directly in series with the regulating valve 116 and between said valve and the steam supply 115 is a pneumatically actuated shut-off valve 125 of the direct-acting class, normally resting in its full open position and subject to closing upon the application of air to its diaphragm top. By-passing the valves 116 and 125, and therefore adapted to admit steam directly from the supply 115 to the circulating system, is a pneumatically operated shut-off valve 126 of the reverse-acting class, normally resting in its closed position, and adapted to be opened by the application of air pressure to its diaphragm top.

A piston valve 127 is provided with three body ports 128, 129, and 130, and with a slidable piston member 131 having a normal neutral position in which port 128 is not in communication with either of the other ports, and adapted upon longitudinal displacement to place port 128 in communication with either port 129 or port 130, but never with both at the one time. Port 129 is placed in communication with the diaphragm top of shut-off valve 125 by means of a conduit 132; and port 130 with valve 126 through a conduit 133. The piston element 131 is subject to actuation by opposed bellows members 134 and 135 constructed and connected in a manner identical with the corresponding elements in Fig. 1, so that under normal steady-state conditions the piston element 131 will rest in its neutral position, closing off air from the diaphragm tops of valves 125 and 126, so that the former will rest in its open position and the latter in its closed position, permitting steam from the source 115 to be freely supplied to the regulating valve 116 and normal control to be maintained.

In the event of sudden changes in the temperature, as hereinabove set forth, the piston element 131 of valve 127 will be actuated in a sense to admit air to the diaphragm top of either valve 125 or 126, according to whether the demand is for a sudden reduction or a sudden increase of the supply of steam. Admission of air to the top of valve 125 will cause it to close, shutting off the steam supply without regard to the then setting of the regulating valve 116, while admission of air to the top of valve 126 will cause it to be opened, permitting steam to pass from the supply source directly into the circulating pipe without regard to the then setting of valve 116. Either of these superimposed actions will continue until steady-state conditions have been restored, whereupon the piston element 131 will assume its neutral position, allowing the shut-off valves to revert to their normal settings and normal regulation to be re-established.

Similarly, with the electrical system described, instead of superimposing the auxiliary circuits upon the motor circuit for the normal valve control, it will be understood that these circuits may be connected to respective motor means for controlling a pair of auxiliary valves such as set forth in the arrangement illustrated in Fig. 6.

I claim:

1. In a system for regulating the temperature of a fluid flowing through a heat exchanger in which heat is transferred to said fluid from another fluid: a primary control means for establishing and maintaining at a predetermined temperature the flowing fluid emerging from the exchanger, and a secondary and normally inactive means temporarily affording a complete and dominating control over the action of said primary control means and subject to the temperature of the flowing fluid at another point in its flow.

2. In a system for regulating the temperature of a fluid flowing through a heat exchanger in which heat is transferred to said fluid from another fluid: a temperature-sensitive element exposed to the final temperature of said flowing fluid emerging from the exchanger, primary control means subject to said temperature-sensitive element and adapted to regulate the said final temperature to a predetermined value through control of the temperature of said other fluid, a second temperature-sensitive element exposed to said flowing fluid at another point in its flow, and normally inactive control means responsive to said last-named sensitive element and adapted to superimpose on the action of said primary control means a transient control action tending to anticipate the control effect of temperature changes at said first-named temperature-sensitive element normally following temperature changes at said last-named temperature-sensitive element.

3. In a system for regulating the temperature of a fluid flowing through a heat exchanger in which heat is transferred to said fluid from another fluid; a temperature-sensitive element exposed to the final temperature of said flowing fluid emerging from the exchanger, primary control means subject to said temperature-sensitive element and adapted to regulate the said final temperature to a predetermined value through control of the temperature of said other fluid, a second temperature-sensitive element exposed to said flowing fluid prior to its entry to said exchanger, and normally inactive control means responsive to said last-named sensitive element and adapted to superimpose on the action of said primary control means a transient control action dominating said primary control action and tending to anticipate the control effect of temperature changes at said first-named temperature-sensitive element normally following temperature changes at said last-named temperature-sensitive element.

4. In a system for regulating the temperature of a fluid flowing through a heat exchanger in which heat is transferred to said fluid from another fluid: a temperature-sensitive element exposed to the final temperature of said flowing fluid emerging from the exchanger, primary control means subject to said temperature-sensitive element and adapted to regulate the said final temperature to a predetermined value through control of the temperature of said other fluid, a second temperature-sensitive element exposed to said flowing fluid prior to its entry to said exchanger, and normally inactive control means responsive to said last-named sensitive element and adapted to superimpose on the action of said primary control means a transient control action, and means to limit the action of said normally inactive control means to times of change of temperature at said second-named element, tending to anticipate the control effect of temperature changes at said first-named temperature-sensitive element normally following temperature changes at said last-named temperature-sensitive element.

5. In a system for heating and maintaining the temperature of a flowing fluid and including a heating device and a primary temperature regulator therefor: means sensitive to the temperature of the stream of flowing fluid emerging from the heating device to control the heating effect of said heating device, a secondary temperature regulator adapted to override the effect of the primary regulator, and means sensitive to the temperature of the fluid at another point in its flow to control the action of said secondary temperature regulator.

6. In a fluid-pressure-actuated control system for establishing and maintaining at a predetermined value the temperature of a flowing fluid and including a heat exchanger: the combination with a source of fluid pressure, a primary regulating mechanism including a fluid-pressure-actuated valve communicating with the source of fluid pressure, and means responsive to changes in temperature of the fluid emerging from said exchanger adapted to effect corresponding changes in said fluid pressure; of a secondary regulating mechanism including means responsive to changes in the temperature of said flowing fluid at another point in its flow, a three-way valve member connected with the source of actuating fluid supply, to the primary regulating mechanism and to the atmosphere, said valve having a neutral position in which the flow of the actuating fluid therethrough is completely shut off, one extreme position in which the actuating fluid may be admitted to increase the fluid pressure upon said primary mechanism and another extreme position in which the actuating fluid may be bled therefrom to decrease its pressure, a pair of opposed bellows members adapted when in equilibrium to maintain said three-way valve member in its neutral position, and time delay means therebetween adapted upon change in the actuating fluid pressure in the secondary regulating mechanism to throw said bellows members temporarily out of equilibrium.

7. In a pneumatic control system for regulating a condition of a flowing fluid and including a source of air under pressure: a fluid-pressure-actuated valve, and means subject to said condition at a point in the flow of said fluid and adapted to regulate the pressure of air admitted thereto in a sense to establish and maintain said controlled condition at a predetermined magnitude: a further valve means adapted alternatively to increase the air pressure on said pressure-actuated valve independently of said regulating means, and to decrease the same by venting more or less of said air to the atmosphere, or to assume a neutral position, and a differential fluid-pressure-actuated means subject to a condition at another point in the flow of said fluid and adapted upon a change in said last-named condition to control said further valve means in a sense first to assume a position to oppose said change in condition, and subsequently to assume its normal position.

8. In a control system for establishing and maintaining at a predetermined value the temperature of a fluid flowing through a heat exchanger in which heat may be transferred to said fluid from a circulating fluid: a temperature-sensitive element exposed to the final temperature of the effluent from said exchange, a motor-valve for regulating the temperature of said circulating fluid, primary regulating means subject to said temperature-sensitive element and adapted to actuate electrical contacts having circuits to operate said motor valve, a second temperature-sensitive element exposed to said flowing fluid at another point in its flow and having associated therewith electrical contacts connected to the circuits associated with said first-named contacts and responsive to changes in temperature of said flowing fluid to render inactive said primary regulating means and independently to operate said motor-valve.

9. In a control system for establishing and maintaining at a predetermined value the temperature of a fluid flowing through a heat exchanger in which heat may be transferred to said fluid from a circulating fluid: a temperature-sensitive element exposed to the final temperature of the effluent from said exchanger, a motor-valve for regulating the temperature of said circulating fluid, primary regulating means subject to said temperature-sensitive element and adapted to actuate electrical contacts having circuits to operate said motor valve, a second temperature-sensitive element exposed to said flowing fluid prior to its emergence from said exchanger and having associated therewith electrical contacts connected to the circuits associated with said first-named contacts and responsive to changes in temperature of said flowing fluid to render inactive said primary regulating means and independently to operate said motor-valve in a sense to anticipate the action of said primary regulating means in response to the effect of said change after passing through said heat exchanger.

10. In an electrical control system of the class having a primary controller subject to a function of a variable to be regulated and a secondary controller subject to another function of said variable, and reversible electric-motor-operated means for effecting said regulation: low and high contacts in said primary controller together with a common contact adapted to engage either said low contact or said high contact in response to changes in said first-named function, and electrical circuits for associating said contacts and said motor-operated means with a source of electrical power for actuating the same, stationary contacts and a movable contacting element in said secondary controller adapted to coact with certain of said stationary contacts to establish an electrical circuit to the common contact of said primary controller when said element is in an intermediate position, and, when deflected from said intermediate neutral position, to interrupt said circuit and coact with certain of said stationary contacts to complete a circuit to a said high or low contact according to the sense of deflection.

11. In a fluid-pressure-actuated control system for establishing and maintaining at a predetermined value the temperature of a flowing fluid and including a heat exchanger: the combination with a source of fluid pressure, a primary regulating mechanism including a fluid-pressure-actuated valve communicating with the source of fluid pressure, and means responsive to changes in temperature of the fluid emerging from said exchanger adapted to effect corresponding changes in said fluid pressure; of a secondary regulating mechanism including means responsive to changes in the temperature of said flowing fluid at another point in its flow, a three-way valve member connected with the source of actuating fluid supply, to the primary regulating mechanism and to the atmosphere, said valve having a neutral position in which the flow of the actuating fluid therethrough is completely shut off, one extreme position in which the actuating fluid may be admitted to increase the fluid pressure upon said primary mechanism and another extreme position in which the actuating fluid may be held therefrom to decrease its pressure, bellows means adapted when in equilibrium to maintain said three-way valve member in its neutral position, and time delay means associated therewith and adapted upon change in the actuating fluid pressure in the secondary regulating mechanism to throw said bellows means temporarily out of equilibrium.

12. In a fluid-pressure-actuated control system for establishing and maintaining at a predetermined value the temperature of a flowing fluid and including a heat-exchanger: the combination with a source of fluid pressure, a primary control mechanism including a fluid-pressure-actuated regulating valve communicating with the source of fluid pressure, and means responsive to changes in the temperature of the fluid emerging from said exchanger to effect corresponding changes in said fluid pressure; of a secondary control mechanism including means responsive to changes in the temperature of said flowing fluid at another point in its flow, a normally open shut-off valve in series with said regulating valve, a normally closed shut-off valve adapted to by-pass both of said valves, and means subject to said second-named responsive means to temporarily actuate one or other of said valves.

13. In a fluid-pressure-actuated control system for establishing and maintaining at a predetermined value the temperature of a flowing fluid and including a heat-exchanger: the combination with a source of fluid pressure, a primary control mechanism including a fluid-pressure-actuated regulating valve communicating with the source of fluid pressure, and means responsive to changes in the temperature of the fluid emerging from said exchanger to effect corresponding changes in said fluid pressure; of a secondary control mechanism including means responsive to changes in the temperature of said flowing fluid at another point in its flow, a normally open fluid-pressure-actuated shut-off valve in series with said regulating valve, a normally closed fluid-pressure-actuated shut-off valve adapted to by-pass both of said valves, a three-way valve member connected with the source of actuating fluid and with each of said shut-off valves and having a neutral position in which the actuating fluid is not admitted to either of the same, one extreme position in which actuating fluid is admitted to said normally open shut-off valve to close the same, and another extreme position in which actuating fluid is admitted to said normally closed valve to open the same, a pair of opposed bellows members adapted when in equilibrium to maintain said three-way valve member in its neutral position, and time delay means therebetween adapted upon change in the actuating fluid pressure, as controlled by said second-named responsive means, in the secondary control mechanism to throw said bellows members temporarily out of equilibrium.

14. In a system for controlling the temperature of a flowing fluid by the admixture therewith of a temperature-affecting agent at a greater or less rate: means for governing the rate of admixture of said agent, primary means for establishing and regulating the setting of said governing means at a value dependent upon the demand for said temperature-affecting agent, and secondary and normally inactive means affording a temporary and dominating control over said primary means, and subject to a condition of said flowing fluid.

FREDERICK A. FAUST.